US007168502B2

(12) United States Patent
Hartmann

(10) Patent No.: US 7,168,502 B2
(45) Date of Patent: Jan. 30, 2007

(54) ELECTRIC POWER TOOL WITH LOCKING MECHANISM

(75) Inventor: Markus Hartmann, Mauerstetten (DE)

(73) Assignee: Hilti Aktiengesellschaft, Schaan (LI)

( * ) Notice: Subject to any disclaimer, the term of this patent is extended or adjusted under 35 U.S.C. 154(b) by 17 days.

(21) Appl. No.: 10/945,702

(22) Filed: Sep. 21, 2004

(65) Prior Publication Data

US 2005/0092149 A1 May 5, 2005

Related U.S. Application Data

(63) Continuation-in-part of application No. 09/931,136, filed on Aug. 16, 2001, now abandoned.

(30) Foreign Application Priority Data

Aug. 17, 2000 (DE) ................................ 100 40 333

(51) Int. Cl.
*B23Q 3/12* (2006.01)

(52) U.S. Cl. .......................... 173/2; 173/156; 173/104; 83/698.41; 83/481

(58) Field of Classification Search .................... 173/2, 173/104, 156, 216, 217; 83/DIG. 1, 481, 83/698.41, 954
See application file for complete search history.

(56) References Cited

U.S. PATENT DOCUMENTS

| | | | | |
|---|---|---|---|---|
| 4,029,159 | A * | 6/1977 | Nymann | 173/217 |
| 4,420,885 | A * | 12/1983 | Todero | 30/381 |
| 5,094,000 | A * | 3/1992 | Becht et al. | 30/475 |
| 5,401,928 | A * | 3/1995 | Kelley | 200/510 |
| 5,464,365 | A * | 11/1995 | Kirn | 451/344 |
| 5,480,009 | A * | 1/1996 | Wieland et al. | 188/77 W |
| 5,601,483 | A * | 2/1997 | Rudolf et al. | 451/359 |
| 6,910,694 | B2 * | 6/2005 | Hartmann et al. | 279/141 |

* cited by examiner

*Primary Examiner*—Rinaldi I. Rada
*Assistant Examiner*—Gloria R. Weeks
(74) *Attorney, Agent, or Firm*—Abelman, Frayne & Schaan

(57) ABSTRACT

An electric power tool has a motor-driven circular tool that can be clamped by means of a clamping device. A mechanical braking device (2) serves to brake the tool. A safety element (4) prevents improper handling of the electric power tool. In a safety position, the safety element (4) prevents the motor from being turned on and activates the braking device (2). In a release position, the safety element (4) allows the motor to be turned on and the braking device (12) is released. An additional locking mechanism prevents that a clamping lever, needed to actuate the clamping device, can be actuated in the clamped state in the safety position. In the release position of the safety element, the locking mechanism is unlocked.

3 Claims, 4 Drawing Sheets

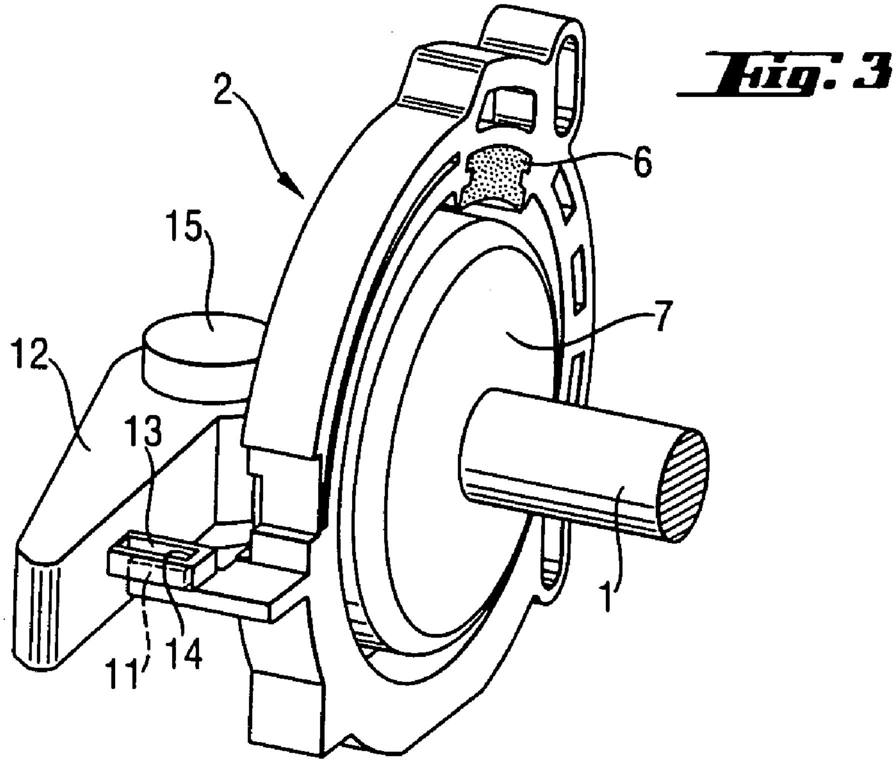
Fig. 3
Fig. 4
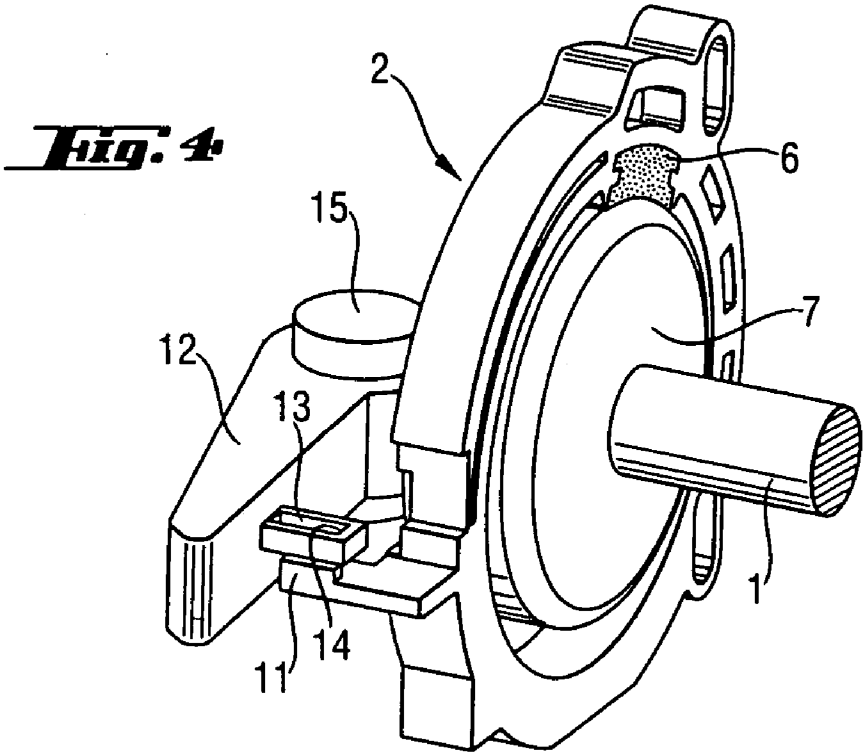

ELECTRIC POWER TOOL WITH LOCKING MECHANISM

RELATED APPLICATION

This is a continuation-in-part of patent application Ser. No. 09/931,135 filed Aug. 16, 2001 now abandoned.

BACKGROUND OF THE INVENTION

The invention relates to an electric power tool, especially to a hand-held circular saw, routing machine and the like, having a circular tool that is motor-driven by means of a shaft, whereby the tool can be clamped to the shaft by means of a clamping device that can be actuated by a clamping lever; having a mechanical braking device that, when activated, brakes the tool; a switching element to turn the motor ON and OFF; and a safety element which, when in a safety position, prevents the motor from being turned on and activates the braking device and which, when in a release position, allows the motor to be turned on and releases the braking device, whereby the braking device is mechanically connected to the safety element.

Electric power tools, especially hand-held circular saws of the type described above, use safety devices in order to prevent a user from improperly handling the hand-held circular saw. Especially electric power tools with circular tools such as, for example, hand-held circular saws, have such safety devices. When a motor is turned off by a switching element, a braking device brakes the tool, thereby preventing said tool from continuing to rotate without control. In this state, a safety element is in its safety position, thus preventing the motor from being turned on again by the switching element. In order to once again drive the tool with the motor, the user first actuates the safety element, which releases the braking device through a mechanical connection. Only in this release position of the safety element is the user able to turn on the motor by actuating the switching element so as to drive the tool via a shaft. In order to adapt the rotational speed of the tool to the motor, a gear can be installed, for example, between the motor and the tool.

Such an electric power tool is known, for example, from EP B1 444,909, with a motor-driven circular tool that can be clamped by means of a clamping device onto a shaft that is connected to the motor. In order to brake the tool, the electric power tool has a mechanical braking device that is mechanically connected to a safety element. The safety element has a safety position in which it is not possible to turn on the motor and in which the braking device is activated. In the release position, the motor can be turned on and the braking device is released.

A drawback of the known device is that the rotating tool can still be uncoupled. Especially in order to save time, the user may be tempted, for example, to operate the clamping device while the tool is still rotating or while the electric power tool is switched on. This drawback exists especially in the case of tool-free clamping devices, and, for example, which components of the electric power tool can be damaged.

SUMMARY OF THE INVENTION

The present invention is based on the objective of further refining the clamping device of the electric power tool and the safety device in such a manner that improper handling by the user can be ruled out, even in the case of tool-free clamping devices. Furthermore, the solution should be cost-effective to manufacture.

According to the invention, this objective is achieved in that a locking mechanism is provided with which the clamping lever in its clamped state is unlocked in the safety position and locked in the release position.

Since the process of clamping and unclamping is already controlled on the clamping lever itself, a structurally simple and effective solution of the objective is possible. In particular, the user of the electric power tool will immediately notice that the clamping device is in the locked state. As a result of the mechanical coupling of the clamping lever with the safety element, by means of the locking mechanism, a reliable locking in the clamped state in the safety position is ensured. Other mechanical solutions that act later in the effect chain of the clamping device are characterized by more complex engineering and consequently are less attractive in terms of their cost-effectiveness. In comparison to an electronic solution, the important advantage exists that the function is ensured, even in case of a power failure, in addition to which the electronic solutions are fundamentally less economical and less sturdy.

Advantageously, the locking mechanism has a hook element attached to the braking device so that, when the clamping lever is in its clamped state, the hook element can be fitted into a recess of the clamping lever and, in the locked state, the hook element grasps behind at least part of the edge of the recess, thus locking the clamping lever in the clamped state. By attaching the hook element to the braking device, when the safety element is actuated, the relative movement is transmitted directly for locking and unlocking the locking mechanism. The locking mechanism has a positive fit. With an electrically operated safety element, the hook element can also be moved by an actuator, for example, by a linear motor, that is controlled by the safety element. Since the hook element grasps behind the edge of the recess on the clamping lever, a stable locking is ensured by the positive fit between the clamping lever and the hook element. In order to achieve a greater path for the hook element in the area of the recess, the hook element can have, for example, at least one joint. An equivalent solution consists, for example, of arranging the hook element on the clamping lever and the recess on the braking device or of establishing the positive fit via an additional mechanical means through the relative movement of the braking device.

In a preferred embodiment, the recess is situated on an external pivoting range of the clamping lever so as to have the greatest possible distance from a pivoting axis of the clamping lever. If forces are exerted on the locked clamping lever from the outside, then an optimal distribution of the load on the locking mechanism is ensured. The closer the locking mechanism is to the place where the force is exerted by the clamping lever, the less the load on the locking mechanism in case of improper operation. This minimizes the risk of failure of the locking mechanism.

BRIEF DESCRIPTION OF THE DRAWINGS

The invention will be explained in greater depth below with reference to an embodiment. In the drawings:

FIG. 3 is a perspective view of a partial representation of the locking mechanism shown in FIG. 1 with a clamping lever in the safety position;

FIG. 4 is a perspective view of a partial representation of the locking mechanism shown in FIG. 1 with a clamping lever in the release position.

DETAILED DESCRIPTION OF THE INVENTION

Figure 1:
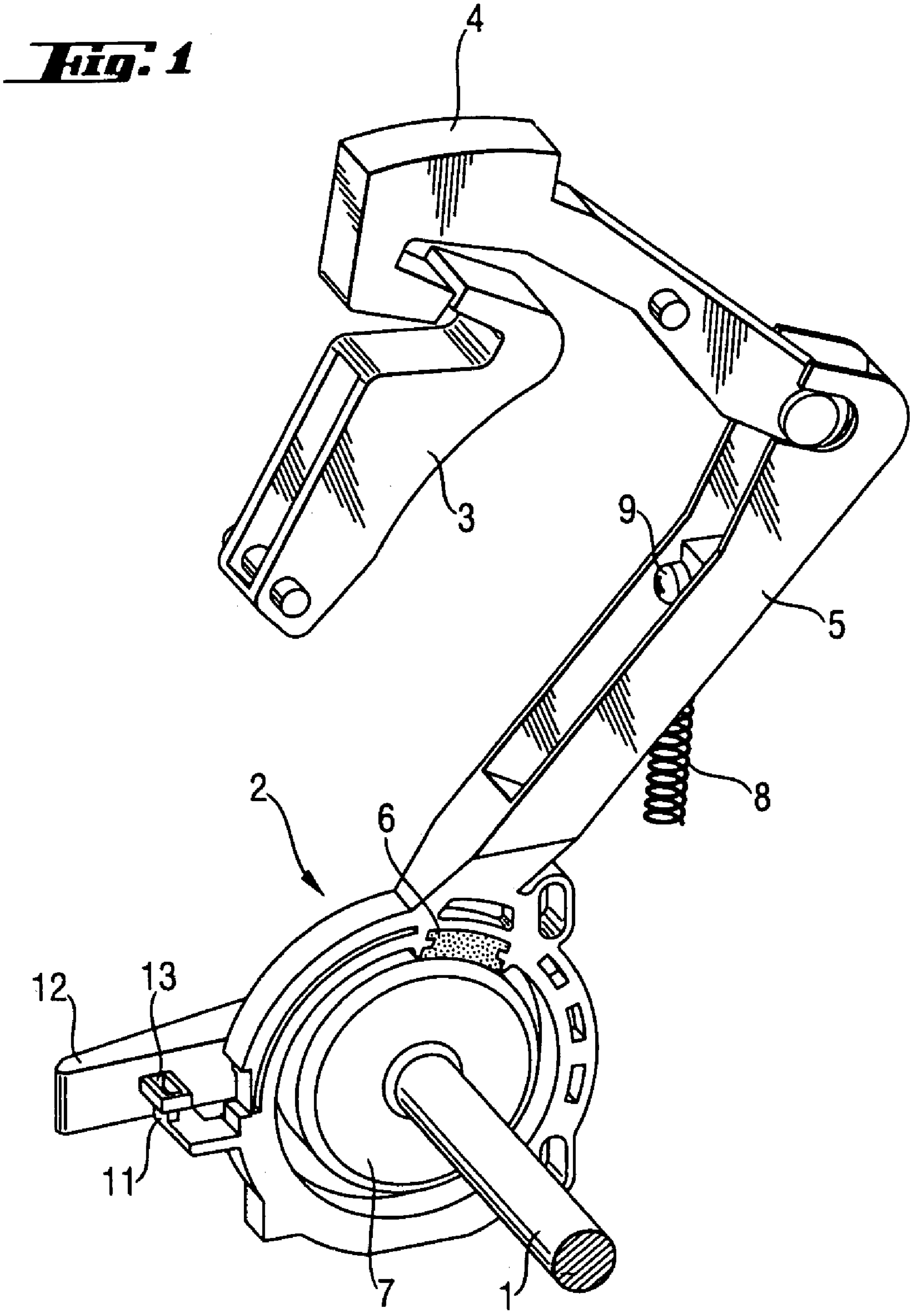
FIG. 1 is a perspective view of a locking mechanism according to the invention in a safety position.
Figure 2:
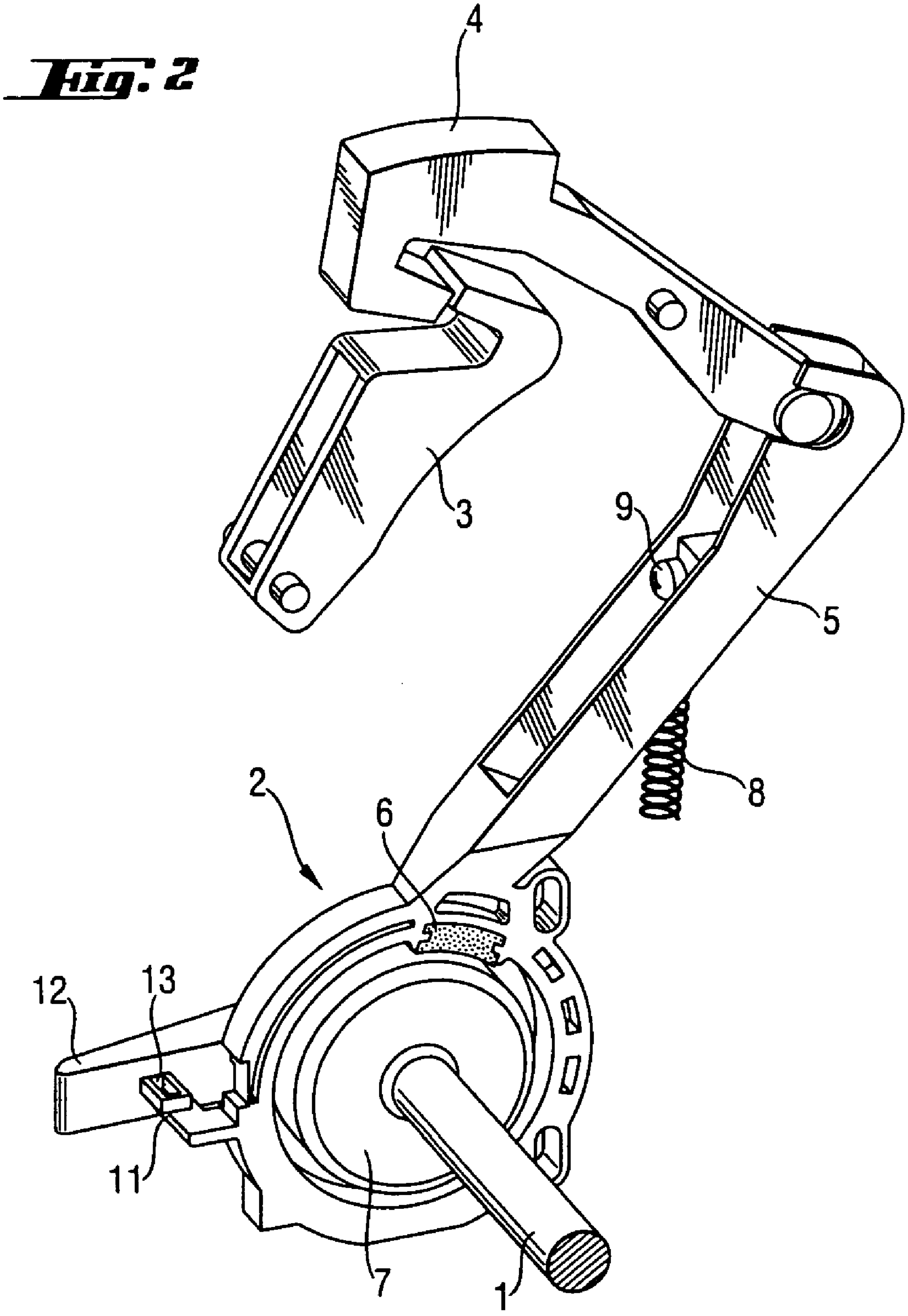
FIG. 2 is a perspective view of the locking mechanism shown in FIG. 1 in a release position.

FIGS. 1 through 4 show an electric power tool according to the invention having a circular tool T that is driven by a motor M, whereby the tool can be clamped to a motor-driven shaft 1 by means of a clamping device C. In order to brake the tool, the electric power tool has a mechanical braking device 2 that is mechanically connected to a safety element 4 by an actuation part 5. The safety element 4 has a safety position in which it is not possible to turn on the motor M and in which the braking device 2 is activated, as is shown especially in FIG. 1. In a release position, the motor M can be turned on by means of a switching element 3 and the braking device is released, which is especially clear from FIG. 2.

The braking device 2 has a brake part 6 attached to the actuation part 5 and a brake drum 7 attached to the shaft 1. When the safety element 4 is in the safety position, then the actuation part 5 is pushed essentially radially with respect to the shaft 1 by means of a spring 8 attached to the actuation part 5 by a screw 9. In this position, the brake drum 7 and the brake part 6 are in contact with each other and, through the existing friction, they brake the tool via the shaft 1. If the safety element 4—in this embodiment, configured as a rocker switch—is pressed, then the actuation part 5 is pulled away from the shaft 1 against the force of the spring 8 and the safety element 4 is in the release position, as is shown especially in FIG. 2. In the release position, the brake part 6 is not in contact with the brake drum 7 and thus the braking device 2 is inactive or released.

The locking mechanism according to the invention, which is shown especially in FIGS. 3 and 4, prevents an actuation of a clamping lever 12 needed to clamp the tool in the release position, as is shown especially in FIG. 3. A bolt 15 supports the clamping lever 12 so that it can pivot about the bolt 15, but the clamping lever 12 is fixed in the axial direction relative to the bolt 15. The locking mechanism has a hook element 11 attached to the braking device 2 and, when the clamping lever 12 is in the clamped state, the hook element 11 can be fitted into a recess 13 of the clamping lever 12. In the locked state, the hook element 11 grasps behind at least part of the edge 14 of the recess 13 and thus prevents pivoting of the clamping lever 12. As a result, it is not possible for the user to actuate the clamping device C. In an unlocked state, the hook element 11 is outside of the recess 13 and the clamping lever 12 can pivot freely.

The hook element 11 is arranged on the braking device 2 and relative to the recess 13 in such a way that the locking mechanism is locked when the safety element 4 is in the release position, and is unlocked when the safety element 4 is in the safety position. This means that the clamping lever 12 can only be actuated when the safety element 4 is in the safety position and thus the tool can be replaced, for example, by a user.

Figure 3A:
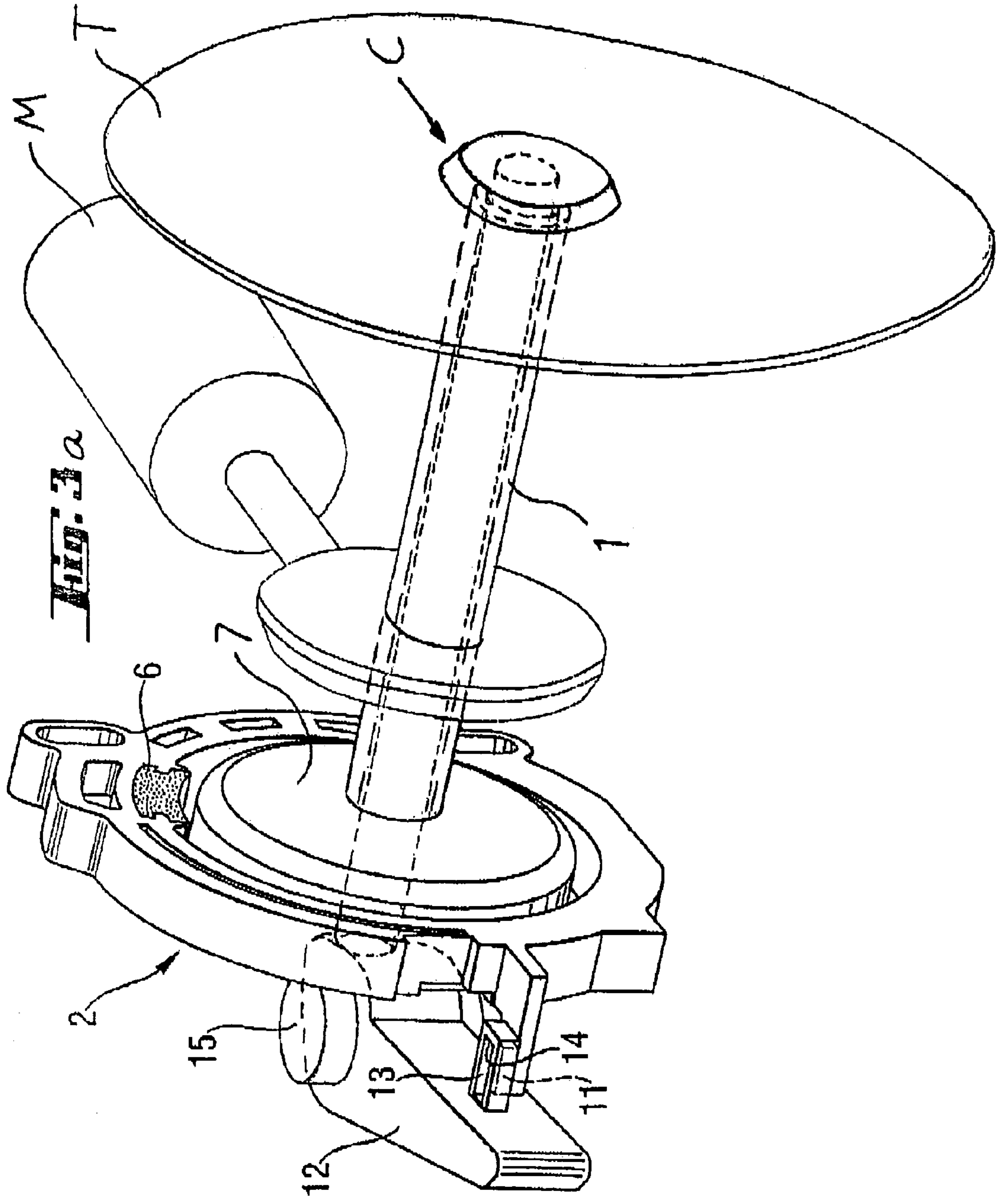
FIG. 3*a* is a view similar to FIG. 3 showing the circular tool mounted on the shaft and driven by the motor.

In FIG. 3*a* the circular tool T is mounted on the shaft 1 and is clamped to the shaft by the clamping device C actuated by the pivotally displaceable clamping lever 12.

What is claimed is:

1. An electric power tool, including a hand-held circular saw and routing machine the power tool having a circular tool (T) motor-driven by an axially extending single part shaft (1) with a first end and a second end with the tool clamped to the first end of the shaft by a tool clamping device (C) actuated by a pivotally displaceable clamping lever (12) located adjacent the second end of said shaft (1), a mechanical braking device (2) mounted on the second end of said shaft and displaceable between a braking position and a release position and spaced axially from said tool clamping device (C), a switching member (3) spaced from the braking device (2) for turning the motor (M) on and off, a safety element (4) engageable by said switching member (3) and mechanically connected by an actuation part (5) to said braking device (2) and displaceable between a safety position for preventing the motor (M) from being turned on and for actuating said braking device and a release position for allowing the motor (M) to be turned on and releasing said braking device, wherein a locking mechanism includes means arranged for preventing pivoting of said clamping lever (12) while the tool (T) is rotating for placing said clamping lever (12) in a clamped state where said clamping lever (12) is unlocked in the safety position of said safety element (4) and is in a locked state in the release position of said safety element.

2. An electric power tool, as set forth in claim 1, wherein said means of said locking mechanism comprises a hook element (11) connected to said braking device (2) whereby with said clamping lever (12) in the clamped state said hook element engages in a recess (13) in said clamping lever (12) and in a locked state said hook element engages at least part of an edge in said recess (13) locking said clamping lever (12) in the clamped state.

3. An electric power tool, as set forth in claim 2, wherein said clamping lever (12) is pivotally displaceable about a bolt (15), and said recess (13) is located at a position spaced laterally from said bolt (15).

* * * * *